Patent 3,403,783 — Oct. 1, 1968

3,403,783
FLOTATION OF PHOSPHATE-CONTAINING MATERIALS

Paulo Abib Andery, Sao Paulo, Brazil, assignor to Zuplatec A. G. Gesellschaft fur Technische Planung und Industrielle Entwicklung, Zurich, Switzerland
No Drawing. Filed Nov. 22, 1965, Ser. No. 509,187
3 Claims. (Cl. 209—167)

ABSTRACT OF THE DISCLOSURE

Phosphate values are recovered from mineral compositions including phosphates and alkali earth carbonates employing a gelatinized starch gum obtained by reacting sodium hydroxide and starch in a ratio in the range of 1:1 to 1:2 to provide a pulp pH of about 7.5–10, said gelatinized starch gum being a depressing agent for the non-phosphate components, adding a collecting agent such as linoleic or oleic acid to collect phosphate values, and effecting froth flotation to collect the phosphate values in the froth and remove depressed alkali earth carbonates as tailings.

---

The obtention of phosphate concentrates appropriate for direct use as fertilizers or for the utilization as industrial raw material for manufacturing the so-called soluble phosphates (supertri- or diphosphates) and other products derived therefrom (polyphosphates) is today a current practice by several operating procedures and methods.

The starting phosphate rocks generally pertain to the following classes:

(I) Sedimentary phosphate rocks and their alteration products. Examples of these rocks which are the most important sources of present production of mineral phosphates are the so-called phosphate rocks of Florida and phosphates of Morocco and Algeria and the so-called phosphorite of the mines of the coastal sedimentary zone of Pernambuco and Paraiba in Brazil.

(II) Residual and eluvial top-layers originating from the complete or nearly complete leaching out of apatitic limestones or apatitic dolomites. In this class are included alluviums secondarily enriched by the more or less complete leaching out of the carbonates which constituted the major part of the original rock with the consequent enrichment in apatite and magnetite which were subordinated or ancillary components of this rock. An example of this class is the presently exploited secondary or residual ore mine of Jacupiranga, Sao Paulo, Brazil.

(III) Primary orebodies containing crystalline phosphates (apatite) as accessory minerals of crystalline limestones and/or dolomites, including portions of such orebodies enriched with apatite by segregation. Examples of this type are the mines occurring in Africa or in the Scandinavian countries and, in Brazil, mines constituted of an intrusive calcareous mass (carbonatite) wherein disseminated apatite and magnetite exist, such as that which is found forming the matrix rock of the above mentioned residual secondary ore near Jacupiranga.

The present invention is relative to an improved process of upgrading such rocks by froth flotation. In one form, the invention is particularly applicable to the third type or class of apatite rock which permits obtaining concentrates of a relatively high $P_2O_5$ content and this with a total cost compatible with the economical expression of the product obtained.

The multiple and persistent experiments effected by the inventor were based upon the apatitic ore of Cajati, Jacupiranga District, State of Sao Paulo, Brazil, but obviously, same are extensive to other ores or rocks of similar characteristics. In this occurrence two rocks are distinguished (sometimes also herein designated as "ores" in the more ample acceptation, i.e., mined material generally), namely, a primary rock of crystalline, apatitic carbonatite of magmatic origin of the above indicated type III, upon which is found a secondary rock as a residual or eluvial top-layer of the above classification type II.

The magmatic primary rock termed carbonatite, which served as raw material for the experiments which led to the first modality of the present invention is comprised of a compact mass of dominant calcium carbonate, crystallized as calcite, corresponding to 75 to 85% of the total, wherein is found disseminated calcium fluorphosphate, as apatite, in greenish yellow needles, corresponding to 10 to 15% of the mass, iron oxide, generally as magnetite, in black crystals, amounting to 4 to 7% of the total, silicates, particularly mica and olivine within the range of 2 to 4% of the mass.

Recent detailed studies have demonstrated that the rock body to be exploited contains on an average 12% apatite which corresponds to 5% $P_2O_5$. Even in the most favourable ranges the $P_2O_5$ content thereof is always lower than 12%.

The upgrading of a relatively poor phosphatic ore requires in order to be economically feasible a simple procedure and the use of not very expensive agents.

The experiments carried out in this regard forthwith disposed of the gravimetric separation seeing the closeness of the respective densities of calcite and apatite, the magnetic separation of iron oxyde only being carried out as a subsidiary operation which does not affect the concentration proper of apatite.

Froth flotation has proven to be the most efficient means to lead to the desired phosphate enrichment with separation of the bulk of non-phosphated minerals.

However, such a concentration of apatite is rendered difficult in that the behaviour of these minerals is very similar to each other in the flotation with anionic collectors applicable to the case, which requires the selective depression of the calcite or, eventually, dolomite, by a previous conditioning step of the pulp.

Generally, the operations carried out in the execution of the first modality of present process with said ore comprise:

(1) The crushing of the rock, blasted in the mine in the form of blocks.

(2) The wet grinding of the phosphate rock in order to liberate the apatite from the other minerals of the rock and to form individual particles which can adhere to the air bubbles at the time of the froth flotation.

(3) The elimination of the extremely fine portion of the ground rock which after pulping with water forms the so-called slime, corresponding to particles less than about 20 microns. This elimination is preferably carried out in hydrocyclones the waste of which is disposed of.

(4) The conditioning of the aqueous pulp containing the appropriately sized minerals in suspension at a high solids content and at a slightly alkaline pH in the pH range of 7.5 to 10.0 by the addition of an adequate quantity or hydrophilic starch as will be hereinafter explained. This conditioning is intended to obtain the stabilized depression of calcite and other alkaline-earth carbonates such as dolomite eventually present. At this stage the pulp presents a solids content in the range of 60 to 75%.

(5) A first froth flotation is effected soon after the above referred to conditioning and with expansion or dilution of the pulp to a solids content between 15% and 30% and at a pH always slightly alkaline preferably in the range of 7.5 to 9 and by the addition of a collecting agent which with forced aeration causes the formation of froth and the selective entrainment in this froth of the particles of phosphates such as apatite. As such a collecting agent a fatty acid optionally saponified is preferably used, preferably linoleic and oleic acids or products rich in them, such as the so-called distillate tall oil and red oil and the like. The addition of the collector is preferably carried out portionwise; the first and main addition which may amount to 80% of total collector is carried out as soon as the pulp enters into the flotation circuit; one to three further additions may be made to the circuit of the pulp which is forwarded to the flotation cells wherein air is bubbled through the suspension or conditioned pulp of the ground ore. Therein the air bubbles adhere to the apatite particles by the modifying action of their surface tension exercised by the collector, which are entrained to the surface of the suspension or pulp, forming a consistent froth which is recovered, constituting a first concentrate or rough concentrate which may be directly centrifuged and dried or refined. In the interior of the cell remains a predominantly calcite suspension, as well as magnetite and silicates which do not adhere to the air bubbles by the positive action of the depressing agent in that they present a greater affinity towards the suspension water and at the outlet of the last cell they constitute the flotation tailing and are discharged from the circuit. This material, in view of being rich in calcium carbonate with an adequate particle size, constitutes a material which is useful as an excellent corrective agent for acid soils, contributing to the economy of the process. Furthermore, the same may comprise about 8–10% of the phosphate mass originally contained in the feed.

(6) One may use one or more of a subsequent cleaner flotation of the rougher concentrate obtained as above, extending the circuit thereof without the necessity of a further addition of reagents and varying the passage speed with forced aeration or intense agitation.

In carrying out the above outlined process the following features proper of the invention should be taken into consideration.

The conditioning or depressing agent of the alkaline-earth carbonate is preferably a caustic soda-gelatinized of jelled starch obtained by the action of a 10% caustic soda upon an aqueous dispersion at about 10% of commercial starch under strong mechanical agitation in relative ratios of 1:1 to 1:2 of the former to the latter. After terminating the gelatinization of the starch and the suspension becoming translucid and with characteristic consistency, the same is diluted e.g., to about 1% gelatinized or solubilized starch content under energetic mechanical agitation.

The thus obtained colloidal solution which is quite alkaline is added, under agitation, to the pulp to be conditioned, at a pre-set rate, e.g. of 600 to 800 g. by ton of ore or rock in the pulp, which, as already indicated above, presents a high solids content (60–75%). Conveniently, such solution is applied as prepared or immediately afterwards.

The proportion of this conditioning agent varies with the effective content of alkaline earth carbonates, the pH, the temperature, the presence of accessory or secondary components and further with the working conditions of the subsequent flotation step, respectively, the action of the collecting agent employed therein.

This collecting agent is preferably added portionwise in small portions to the already conditioned pulp, as already indicated above, at the inlet of the flotation cells and during the travelling of the pulp in this plant. The total addition of collecting agent, at the flotation step, varies with nature of ore, e.g., between 50 to 250 g. per ton of ore, depending upon the phosphate content of the ore and the action of the depressing agent, for Jacupiranga carbonatite.

As has already been explained, the collecting agent is of a fatty character and preferably comprised of fatty acids with high content of insaturates and, thus, liquids or products rich in them or similars. One portion of the fatty acid may be saponified previously or in situ by interaction with the alkali derived from the depressing agent, determining a basic pH in the pulp being treated. Alternatively, the fatty acid may be used together with other oils or related products, for example, olein or hydrocarbon oils such as fuel oil, preferably together with a compatible emulsifier.

The collector is applied, if necessary, in the presence of a specific or additional frothing agent and may be incorporated into the dilution water of the thicker pulp from the conditioning step, respectively to a portion thereof.

In another modality of this invention, the above disclosed principles are applied to the upgrading of other ores of phosphates, of eluvial or sedimentary nature, pertaining to the above indicated types I and II.

The researches were carrier out especially with materials from lixiviation residual deposits of the occurrence at Cajati, Janupiranga District, State of Sao Paulo, Brazil, but laboratory tests showed the possibility of applying this process to other rocks wherein there is no predominancy of crystalline calcite but of other minerals of sedimentary origin or not, notably of iron oxides such as magnetite, silicates such as olivin and feldspars, clays, quartz and so on.

In the concentration treatment or upgrading of these other phosphatic ores or, rather, containing calcium phosphates, by flotation, a selective depressing action of the referred to starch preparation, at the indicated pH range is noted on the generality of accompanying non-phosphatic minerals.

According to the circumstances or the peculiar composition of the material being treated slight changes in the above described scheme for the treatment of carbonatite will occur which do not offer any difficulties to the skilled expert.

For a better understanding of the value of the invention, there follow illustrative examples of the upgrading process of the present invention applied to different types of said rocks or apatite-containing materials.

EXAMPLE 1

In an experimental plant of industrial size, the feed was constituted by blasted intrusive crystalline limestone (carbonatite) mined at the already cited occurrence in the Jacupiranga District. This ore containing disseminated apatite, magnetite and silicates, showed the following analysis:

|  | Percent |
|---|---|
| Apatite 13% | ([1]) |
| Iron oxide (magnetite): |  |
| Expressed as $Fe_2O_3$ | 5.2 |
| Expressed as $Fe_3O_4$ | 5.0 |
| Alkaline-earth carbonates (mainly calcite) | 78 |

[1] Corresponding to 5.5% $P_2O_5$.

The balance of the 100% is constituted of accompanying silicates.

One operates as above disclosed, according to the following method:

The conditioning of the pulp is processed with about 600 g. per ton of ore, of caustic soda-gelatinized starch depressing agent (at 1:1), added at one time to the pulp containing 65% solids in suspension.

The flotation is carried out with pulp diluted to 25% solids at the outlet of the conditioner, with the addition of about 200 g. of collector per ton. This collector comprises technical oleic acid (called red-oil) or with distilled tall-oil added at the rate of 75% at the intake of the flotation circuit and the remaining 25% in the middle of the circuit in the froth flotation cells. The pH of the pulp should at this stage of the process be in the range of 8.0 to 9.0, preferably close to 8.5.

The fractions obtained are:

(1) Apatite concentrate obtained by centrifugation and drying of the froth amounting to about 12% of the charge:

|  | Percent |
|---|---|
| Recovery of apatite from the pulp by flotation | 92 |
| Apatite concentrate titrating $P_2O_5$ | 39.2 |
| Apatite concentrate titrating $Fe_2O_3$ | 0.22 |
| Apatite concentrate carbonates | 5.0 |

(2) The super-fines of the rejected slimes disposed of before the conditioning amount to 12% of the feed:

| | Percent |
|---|---|
| Titrating P₂O₅ | 3.8 |
| Loss of phosphates in said slimes (relative to the feed) | 8 |

(3) Residue or deposit of the flotation:

| | Percent |
|---|---|
| (Tailings) titrating P₂O₅ | 0.6 |
| Loss of phosphates in the flotation residues (relative to the deslimed feed) | 8 |

EXAMPLE 2

In this example magnetic residual material was employed and same is obtained as a by-product of the magnetic upgrading or concentration of ore from apatitic eluvial deposit above indicated as type II.

Generally, this apatitic ore is submitted to coarse and fine crushing operations or simply a grinding since in most cases it presents itself as a friable mass or even already decomposed, followed by a pulping with removal of the fine slime (dispersed particles <20 microns) and a classification such as by gravimetry and/or centrifugation or cycloning, followed by magnetic separation in which step a refuse rich in magnetite and other iron oxides is separated and which entrains with it a considerable proportion of apatite of a coarser granulation. The mean pulp separated from the fine slime and the so-called magnetic refuse constitutes a first apatite concentrate which as such can be put on the market.

A typical analysis of such a magnetic refuse is as follows:

| | Percent |
|---|---|
| Apatite | 57 |
| Titre in P₂O₅ | 24.3 |
| Magnetite, as Fe₃O₄ | 38 |
| Iron oxides, total expressed as Fe₂O₃ | 39.5 |

The remainder for 100% is constituted of diverse silicates, the composition of which varies slightly from one point to another point of said occurrence.

According to present modality of the invention, such a refuse is ground to a sizing of 0.3 mm. to 0.002 mm., and submitted to the above indicated operations of pulping or suspending in an aqueous medium with desliming of super-fines, conditioning the thick pulp, dilution of the pulp with addition of a collector and flotation of the pulp in cells as above disclosed, but with application of the following particularities:

(a) The conditioning is carried out with a pulp of high solids content of the order of 78%. The depressing agent, e.g. the one prepared from the already described hydrophilic gelatinized starch, is added at the rate of 470 g. per ton of said refuse used as feed in present modality of the process.

(b) At the outlet of the conditioner, the pulp receives an addition of oily collector of the same type as indicated above at a rate of 980 g. per ton of ore, dry basis, divided in two portions, 30% right at the outlet of the conditioner and 70% in the flotation circuit.

At the entry of the circuit the thick pulp is diluted to a value in the range of 30 to 35% in order to present, after dilution, a pH close to 9, care being taken so that the pH till the end of the circuit be maintained above 7.5 and preferably above 7.8.

The rough concentrate collected in the flotation froths amounted to a recovery of 89.4% of the existing phosphate and by analysis indicated:

| | Percent |
|---|---|
| P₂O₅ | 37.4 |
| Iron oxides, expressed as Fe₂O₃ | 2.94 |

Total losses constitute 10.6% of the fed mass. In the desliming of the super-fines there is a loss of 5% of the phosphate content originally present in the material being treated.

The flotation refuse comprising the depressed material contained the major part of accompanying silicates and heavy oxides entrains with it the remainder of the phosphate.

EXAMPLE 3

In this example, one started with a residual ore of sedimentary origin titrating:

| | Percent |
|---|---|
| Apatite | ¹ 49.7 |
| Magnetite Fe₃O₄ | ² 29.0 |

¹ P₂O₅—20.9%.
² Iron oxides as Fe₂O₃—30%.

The remainder for 100% is constituted of clays and other silicates.

The applied procedure was similar to that above disclosed, except for the following differential features:

Conditioning.—The same was carried out with 70% solids at a rate of 800 g. of said depressor per ton of ore.

Froth flotation.—The same was carried out with 25–35% diluted pulp, at a pH of 9.0, with portionwise addition of oily collector at a rate of 1450 g. (total) per ton of ore during the passage of the pulp in the flotation cells, e.g.:

| | Percent of total |
|---|---|
| Third cell | 60 |
| Fourth cell | 24 |
| Fifth cell | 16 |

The rougher concentrates separated in the froths titrating:

| | Percent |
|---|---|
| P₂O₅ | 38.10 |
| Fe₂O₃ | 1.91 | insuring a total recovery, by the flotation, of 91.0% of the P₂O₅ content, i.e., of the apatite originally present.

The losses in the process amount to 9% of the P₂O₅ of the initial mass, the rejected slimes amount to 13% in mass of the total.

The refuse of the flotation comprises 3.30% of the P₂O₅ originally existing in the mass which shows the outstanding selectivity of the process applied according to the technical improvement afforded by the present invention.

I claim:

1. A froth flotation process for recovering phosphate values from mineral compositions containing phosphates and a major amount of alkali earth carbonates as gangue, comprising adding to a cenecentrated aqueous pulp of said mineral compositions a gelatinized starch gum gelatinized by interaction with sodium hydroxide employing a ratio of sodium hydroxide to starch in the range of 1:1 to 1:2, in an amount to provide in the pulp a pH of about 7.5–10, said gelatinized starch gum being a depressing agent for the non-phosphate components and especially for alkali-earth carbonates in said composition, diluting the thus conditioned pulp to a solids concentration of about 15–30 weight percent, adding to the diluted pulp a fatty acid collecting agent selected from the group consisting of linoleic and oleic acids to collect phosphate values therefrom, maintaining the pH in the range of 8–9, passing air through the pulp to effect froth flotation, collecting phosphate values in the froth, and removing depressed alkali earth carbonates as tailings from the flotation step.

2. A process according to claim 1, wherein the phosphate values in the froth removed from the froth flotation step are subjected to at least one additional froth flotation recovery treatment.

3. A process according to claim 1, wherein the froth flotation step is carried out in a plurality of flotation cells, and wherein the fatty acid collecting agent is added portionwise to the pulp with the major portion of the collecting agent being added adjacent the inlet to the first cell and the remainder being added to the pulp downstream thereof within the flotation cells.

References Cited
UNITED STATES PATENTS

| | | | |
|---|---|---|---|
| 2,599,530 | 6/1952 | Hodges | 209—166 |
| 3,151,062 | 9/1964 | Duke | 209—160 X |
| 2,327,408 | 4/1941 | Ellis | 209—166 |
| 2,341,046 | 2/1944 | Kirby | 209—166 |
| 2,362,432 | 11/1944 | Cahn | 209—166 |
| 2,466,995 | 4/1949 | McMurray | 209—167 |
| 2,497,863 | 2/1950 | Clemmer | 209—166 |
| 2,525,146 | 10/1950 | McMurray | 209—166 |
| 2,564,367 | 8/1951 | Le Baron | 209—166 |

OTHER REFERENCES

Chemical Abstracts, vol. 62, 1964, 1355d.

HARRY B. THORNTON, *Primary Examiner.*

R. HALPER, *Assistant Examiner.*